US009031909B2

(12) United States Patent
Iyer

(10) Patent No.: US 9,031,909 B2
(45) Date of Patent: May 12, 2015

(54) PROVISIONING AND/OR SYNCHRONIZING USING COMMON METADATA

(75) Inventor: Ganeshan Iyer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 13/306,707

(22) Filed: Nov. 29, 2011

(65) Prior Publication Data

US 2013/0138612 A1    May 30, 2013

(51) Int. Cl.
  G06F 7/00       (2006.01)
  G06F 17/00      (2006.01)
  G06F 17/30      (2006.01)
  G06F 13/14      (2006.01)

(52) U.S. Cl.
  CPC .................. *G06F 17/30011* (2013.01)

(58) Field of Classification Search
  CPC ................. G06F 17/30575; G06F 17/30011; G06F 17/30595
  USPC .......... 707/610, 615, 1/1, 613, 687, 802, 822, 707/648, 694–695, 737, 740, 622, 638, 707/703; 455/502; 711/118, 156, 170; 709/214, 223–226
  See application file for complete search history.

(56) References Cited

U.S. PATENT DOCUMENTS

| 7,039,661 B1 * | 5/2006 | Ranade .................... 707/610 |
| 7,523,146 B2 | 4/2009 | Holt et al. |
| 2005/0256907 A1 | 11/2005 | Novik et al. |
| 2006/0069809 A1 | 3/2006 | Serlet |
| 2008/0201366 A1 * | 8/2008 | Devarakonda et al. ... 707/103 Y |
| 2009/0196179 A1 | 8/2009 | Clark et al. |
| 2009/0196311 A1 | 8/2009 | Khosravy |
| 2011/0125710 A1 | 5/2011 | Barnes et al. |

OTHER PUBLICATIONS

Zheng, et al., "Feres: Flexible and Efficient Replica Synchronization for Diverse Environments", Retrieved at <<http:// citeseerx.ist.psu.edu/viewdoc/download?doi=10.1.1.140.3058&rep=rep1&type=pdf, Aug. 2008, pp. 1-11.
Novik, et al., "Peer-to-Peer Replication in WinFS", Retrieved at <<http://research.microsoft.com/pubs/65604/tr-2006-78.pdf, Technical Report MSR-TR-2006-78, Microsoft Research, Jun. 2006, pp. 1-17.

* cited by examiner

Primary Examiner — Usmaan Saeed
Assistant Examiner — Cecile Vo
(74) Attorney, Agent, or Firm — Aneesh Mehta; Kate Drakos; Micky Minhas

(57) ABSTRACT

Techniques are described herein that are capable of provisioning and/or synchronizing a data store using common metadata. For instance, a common instance of metadata may be used in lieu of multiple instances of the metadata that correspond to respective items in the data store for indicating a time at which the data store was provisioned. Each time a change occurs with respect to an item in a data table of the data store after provisioning of the data store, a record may be added or updated in a corresponding tracking table. When a request is made for changes that have occurred with respect to the items in a data table, the common instance of the metadata may be used to generate a record in the corresponding tracking table for each item in the data table that did not change since the data store was provisioned.

20 Claims, 6 Drawing Sheets

PROVISIONING AND/OR SYNCHRONIZING USING COMMON METADATA

BACKGROUND

Nodes in a networked system often include data stores. Data from a source node may be copied to a target node using a process referred to as synchronization. Data stores in the source node (i.e., source data stores) typically are provisioned before those data stores are synchronized with data stores in the target node (i.e., target data stores). Provisioning is a process in which information (e.g., metadata) regarding a data store is gathered, so that the information may be used during synchronization of the data store.

A variety of techniques have been proposed for provisioning and synchronizing data stores. However, each such technique has its limitations. In one example, state based techniques have been developed that provide a fixed state for each item in a source data store. Accordingly, such techniques typically maintain a one-to-one mapping between items in the source data store and instances of metadata that correspond to those respective items, at least until an item is deleted from the source data store. For instance, if item(s) are deleted from the source data store, the corresponding instances of metadata remain in the database. Thus, it is possible for a number of instances of the metadata to exceed a number of the items in the source data store. Metadata that corresponds to items that have been deleted from a source data store are referred to as "tombstones". Although state based techniques may support deletion of tombstones, such techniques often utilize a relatively great amount of data storage space, which increases as data is added to the source data store. Moreover, some functionalities such as "fast-init" employ metadata "fixup" for items in a source data store that are synchronized with a target data store. Metadata fixup is a process in which instances of metadata that correspond to respective items in a source data store are serially updated during provisioning of the source data store. Metadata fixup may consume a substantial amount of time and/or processing resources.

In another example, event based techniques have been developed that track events that occur with respect to the networked system to determine which items in a source data store are changed as a result of the events. For instance, a file based event technique may track calls to a CreateFile application programming interface (API). Each event leads to creation of metadata that tracks changes that occur with respect to the networked system. In a subsequent synchronization operation, a data structure (e.g., a queue) is examined for metadata created due to such events, and the data corresponding to the metadata is synchronized. In event based techniques, the amount of metadata is proportional to the number of events that occur with respect to the networked system. However in a net-changes synchronization scenario, in which the items in a source data store may be sent once, additional processing may be performed to optimize and compress events that correspond to the same set of data.

SUMMARY

Various approaches are described herein for, among other things, provisioning and/or synchronizing a data store using common metadata. The common metadata (referred to herein as a common instance of metadata) may be used in lieu of multiple instances of the metadata that correspond to respective items in the data store for indicating a time at which the data store was provisioned. For instance, during provisioning of the data store, a tracking table may be generated for each data table in the data store. Each tracking table may be used during a synchronization of the data store to indicate changes that have occurred with respect to items in the corresponding data table since the data store was provisioned. Accordingly, each tracking table may be generated to include no records (e.g., instances of metadata) upon completion of the provisioning of the data store. Rather, each time a change occurs with respect to an item in a data table of the data store after the provisioning of the data store, a record may be added or updated in the corresponding tracking table. When a request is made for changes that have occurred with respect to the items in a data table, the common instance of the metadata may be used to generate a record in the corresponding tracking table for each item in the data table that did not change since the data store was provisioned.

A method is described in which a first data store in a first node is provisioned for synchronization with a second data store in a second node for a time period that is independent of a size of the first data store. The first data store includes a data table having items. The provisioning includes determining a time at which the first data store is provisioned and generating a common instance of metadata that is common to the items to indicate the time at which the first data store is provisioned.

A system is described that includes provisioning logic. The provisioning logic is configured to provision a first data store in a first node for synchronization with a second data store in a second node for a time period that is independent of a size of the first data store. The first data store includes a data table having items. The provisioning logic includes time logic and metadata logic. The time logic is configured to determine a time at which the first data store is provisioned. The metadata logic is configured to generate a common instance of metadata that is common to the items to indicate the time at which the first data store is provisioned.

A computer program product is described that includes a computer-readable medium having computer program logic recorded thereon for enabling a processor-based system to synchronize a first data store in a first node with a second data store in a second node. The computer program product includes a program logic module for enabling the processor-based system to provision the first data store for synchronization with the second data store for a time period that is independent of a size of the first data store. The first data store includes a data table having items. The program logic module includes time logic and metadata logic. The time logic is for enabling the processor-based system to determine a time at which the first data store is provisioned. The metadata logic is for enabling the processor-based system to generate a common instance of metadata that is common to the items to indicate the time at which the first data store is provisioned.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodi- FIG. 1 is a block diagram of an example synchronization system in accordance with an embodiment.

Figure 1:
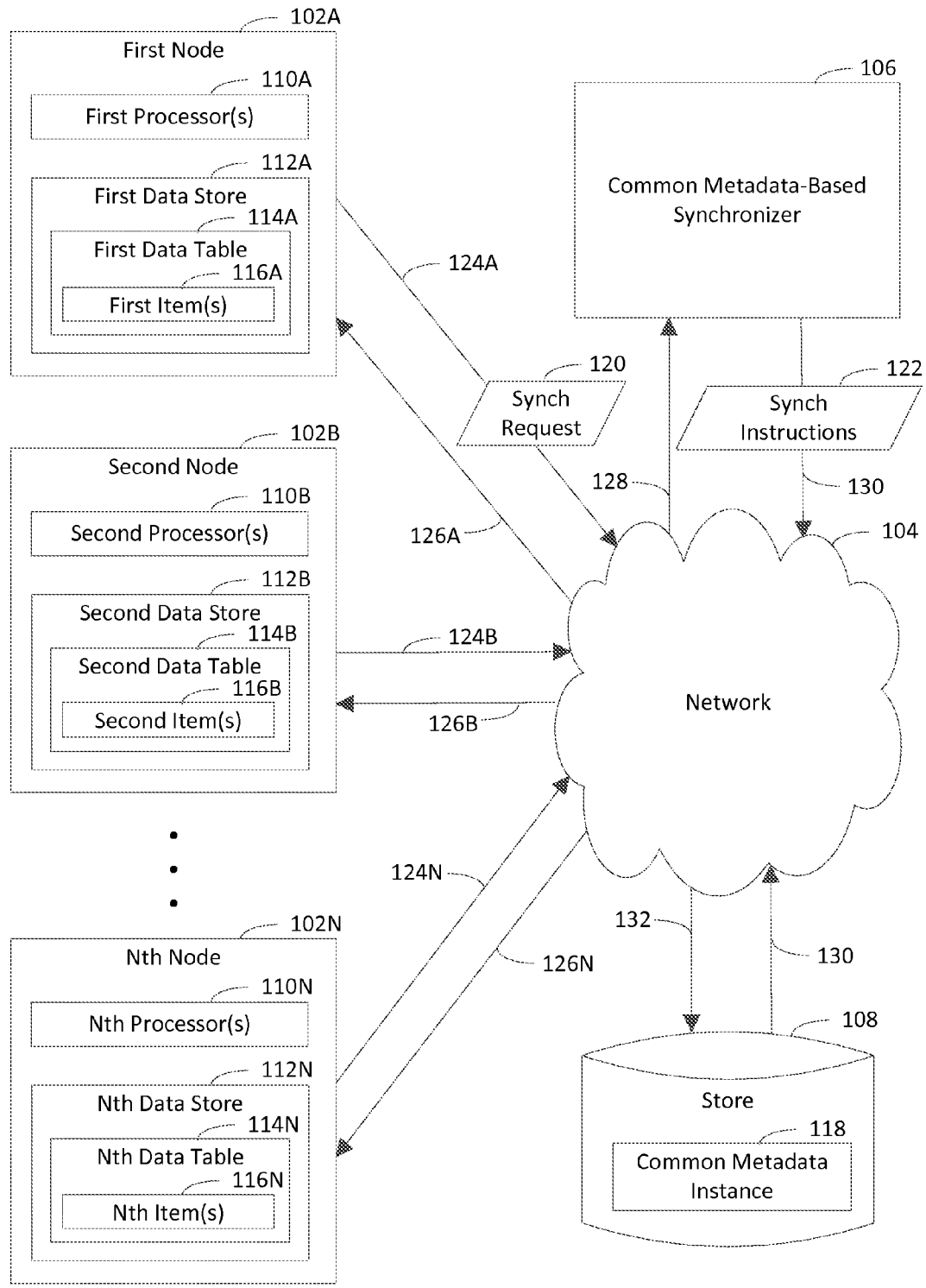

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of provisioning and/or synchronizing a data store using common metadata. The common metadata (referred to herein as a common instance of metadata) may be used in lieu of multiple instances of the metadata that correspond to respective items in the data store for indicating a time at which the data store was provisioned. For instance, during provisioning of the data store, a tracking table may be generated for each data table in the data store. Each tracking table may be used during a synchronization of the data store to indicate changes that have occurred with respect to items in the corresponding data table since the data store was provisioned. Accordingly, each tracking table may be generated to include no records (e.g., instances of metadata) upon completion of the provisioning of the data store. Rather, each time a change occurs with respect to an item in a data table of the data store after the provisioning of the data store, a record may be added or updated in the corresponding tracking table. When a request is made for changes that have occurred with respect to the items in a data table, the common instance of the metadata may be used to generate a record in the corresponding tracking table for each item in the data table that did not change since the data store was provisioned.

Example techniques described herein have a variety of benefits as compared to conventional techniques for provisioning and/or synchronizing a data store. For instance, the example techniques may be capable of generating a tracking table during provisioning of a data store to include no records. The example techniques may be capable of creating versions of records in the tracking table dynamically during synchronization of the data store based on a common (e.g., single and/or non-item specific) instance of metadata that is generated during the provisioning of the data store, even if the items in the data store that correspond to those records are not modified after provisioning. The example techniques may be capable of generating the common instance of metadata to indicate a time at which the data store is provisioned. Accordingly, items in the data store that are not changed after the provisioning may be associated with the time at which the data store is provisioned, while items in the data store that are changed after the provisioning may be associated with respective times at which the respective items are changed.

The example techniques may consume less time and/or fewer resources than the conventional techniques during provisioning and/or synchronization of a data store. For instance, the example techniques need not generate a record in a tracking table for each item in a data table during provisioning of a data store that includes the data table. Accordingly, the time used to generate a common instance of metadata and an empty tracking record during provisioning of a data store may be substantially less than the amount of time traditionally used to generate a record in a tracking table for each item that is included in the data store. Moreover, the amount of data storage space used to store a common instance of metadata and an empty tracking record upon completion of the provisioning of a data store may be substantially less than the amount of data storage space that is traditionally used to store a tracking table that includes a record for each item that is included in the data store.

FIG. 1 is a block diagram of an example synchronization system 100 in accordance with an embodiment. Generally speaking, synchronization system 100 operates to provision and synchronize data stores using a common instance of metadata for each data table in the data stores that are to be synchronized. For instance, a first common instance of metadata is used for a first table; a second common instance of metadata is used for a second table, and so on. As shown in FIG. 1, synchronization system 100 includes a plurality of nodes 102A-102N, a network 104, a common metadata-based synchronizer 106, and a store 108. Communication among nodes 102A-102N, common metadata-based synchronizer 106, and store 108 is carried out over network 104 using well-known network communication protocols. Network 104 may be a wide-area network (e.g., the Internet), a local area network (LAN), another type of network, or a combination thereof.

Nodes 102A-102N are processing systems that are capable of communicating with common metadata-based synchronizer 106. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, etc. Accordingly, each of the nodes 102A-102N may be a database server (e.g., an Oracle server, a structured query language (SQL) server, etc.), a file server, or other suitable type of processing system. Although nodes 102A-102N are described herein as being processing systems, it will be recognized that any one or more of nodes 102A-102N may be implemented as a virtual machine.

Nodes 102A-102N are configured to provide synchronization requests (e.g., hypertext transfer protocol (HTTP) requests, tabular data stream (TDS) requests, etc.) toward common metadata-based synchronizer 106 through network 104 via respective connections 124A-124N. Each such request indicates that a data store in a source node that provides the request is to be synchronized with a data store in a target node that is identified in the request. First node 102A is shown in FIG. 1 to provide synchronization request 120 (a.k.a. synch request 120) toward common metadata-based synchronizer 106 via connection 124A for illustrative purposes. For instance, the synch request 120 may indicate that first data store 112A is to be synchronized with second data store 112B in second node 102B. In some embodiments, a user initiates a synchronization request using a client (e.g., a Web browser, Web crawler, non-Web-enabled client, etc.) deployed on a node 102 that is owned by or otherwise accessible to the user for the purpose of accessing common metadata-based synchronizer 106 via network 104.

Nodes 102A-102N include respective processors 110A-110N and respective data stores 112A-112N. Each of the data stores 112A-112N includes (e.g., stores) zero or more data tables. Data stores 112A-112N are shown in FIG. 1 to include respective data tables 114A-114N for illustrative purposes and are not intended to be limiting. Data tables 114A-114N include respective items 116A-116N. Examples of an item include but are not limited to a row of a database, a column of a database, a file, a data object, etc. Processors 110A-110N are configured to perform operations in accordance with synchronization instructions, such as synch instructions 122, which are received from common metadata-based synchronizer 106. Processors 110A-110N may receive such instructions (or respective subsets thereof) via respective connections 126A-126N. For example, processors 110A-110N may manipulate subsets of the respective items 116A-116N based on such synchronization instructions. In accordance with this example, if the synch request 120 indicates that first data store 112A is to be synchronized with second data store 112B, second processor(s) 110A in second node 102B may change one or more of the second item(s) 116B in response to the synch instructions 122. Example ways in which an item may be changed in a data table include but are not limited to adding the item to the data table, deleting the item from the data table, or changing a characteristic (e.g., at least a portion of the content) of the item.

Common metadata-based synchronizer 106 is a processing system that is configured to provision and synchronize data stores 112A-112N in response to synchronization requests from respective nodes 102A-102N. Common metadata-based synchronizer 106 receives such requests via connection 128. Upon receiving a synchronization request, common metadata-based synchronizer 106 analyzes the request to determine a source node that provides the request and to determine which of the nodes 102A-102N is identified by the request to be a target node. Common metadata-based synchronizer 106 may determine other information based on the request, such as which data store(s) in the source node are identified to be source data store(s), which data store(s) in the target node are identified to be target data store(s), etc. During provisioning of each source data store, common metadata-based synchronizer 106 generates a tracking table and a common instance of metadata to be associated with that source data store. Each tracking table may include no records upon completion of provisioning the corresponding source data store.

Common metadata-based synchronizer 106 synchronizes each source data store with a corresponding target data store in response to provisioning that source data store. For each identified change that occurs with respect to an item in a data table in a source data store since the source data store was provisioned, common metadata-based synchronizer 106 adds or updates a record in a tracking table that corresponds to the data table. If no other change has occurred with respect to that item since provisioning of the source data store, common metadata-based synchronizer 106 adds a record to the tracking table to indicate the identified change. If another change has occurred with respect to the item since provisioning of the source data store, common metadata-based synchronizer 106 updates an existing record in the tracking table to indicate the identified change.

Common metadata-based synchronizer 106 is configured to provide synchronization instructions, such as synch instructions 122, through network 104 via connection 130 to facilitate synchronization of the source data store(s) with the target data store(s). For example, if synch request 120 indicates that first data store 112A is to be synchronized with second data store 112B, common metadata-based synchronizer 106 may provide synch instructions 122 toward second node 102B via connection 130 to cause second processor(s) 110B to change one or more of the second item(s) 116B to be the same as one or more of the respective first item(s) 116A.

Store 108 includes (e.g., stores) each common instance of metadata that is generated by common metadata-based synchronizer 106. Store 108 receives each common instance of metadata through network 104 via connection 132. Store 108 provides each common instance of metadata to common metadata-based synchronizer 106 through network 104 via connection 130 in response to a retrieval request that is received from common metadata-based synchronizer 106. For instance, common metadata-based synchronizer 106 may provide a retrieval request to retrieve a common metadata instance 118 from store 108 during synchronization of a data store that is associated with the common metadata instance 118 in order to generate record(s) in a tracking table that correspond to respective item(s) in the data store that have not changed since provisioning of the data store. Some example techniques for provisioning and/or synchronizing a data store using common metadata are discussed in further detail below with reference to FIGS. 2-7.

Common metadata-based synchronizer 106 may be implemented in various ways to provision and/or synchronize data store(s), including being implemented in hardware, software, firmware, or any combination thereof. For example, common metadata-based synchronizer 106 may be implemented as computer program code configured to be executed in one or more processors. In another example, common metadata-based synchronizer 106 may be implemented as hardware logic/electrical circuitry. In an embodiment, common metadata-based synchronizer 106 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Each of data stores 112A-112N and store 108 may be any suitable type of store. One type of store is a database. For instance, any one or more of data stores 112A-112N and/or store 108 may be a relational database, an entity-relationship database, an object database, an object relational database, an extensible markup language (XML) database, etc. Store 108 is shown in FIG. 1 to be external to nodes 102A-102N and common metadata-based synchronizer 106 for illustrative purses and is not intended to be limiting. It will be recognized that store 108 or a portion thereof may be included in any one or more of nodes 102A-102N and/or common metadata-based synchronizer 106. For instance, store 108 or a portion thereof may be distributed across two or more of nodes 102A-102N.

FIGS. 2-6 depict flowcharts 200, 300, 400, 500, and 600 of example methods for provisioning and/or synchronizing a data store in accordance with embodiments. Flowcharts 200, 300, 400, 500, and 600 may be performed by common metadata-based synchronizer 106 of synchronization system 100 shown in FIG. 1, for example. For illustrative purposes, flowcharts 200, 300, 400, 500, and 600 are described with respect to a common metadata-based synchronizer 700 shown in FIG. 7, which is an example of a common metadata-based synchronizer 106, according to an embodiment. As shown in FIG. 7, common metadata-based synchronizer 700 includes provisioning logic 702 and synchronization logic 704. Provisioning logic 702 includes time logic 706, metadata logic 708, and tracking logic 710. Synchronization logic 704 includes first record logic 712, second record logic 714, provision logic 716, knowledge logic 718, determination logic 720, and deletion logic 722. Further structural and operational embodiments will be apparent to persons skilled in the relevant art(s) based on the discussion regarding flowcharts 200, 300, 400, 500, and 600.

Figure 2:
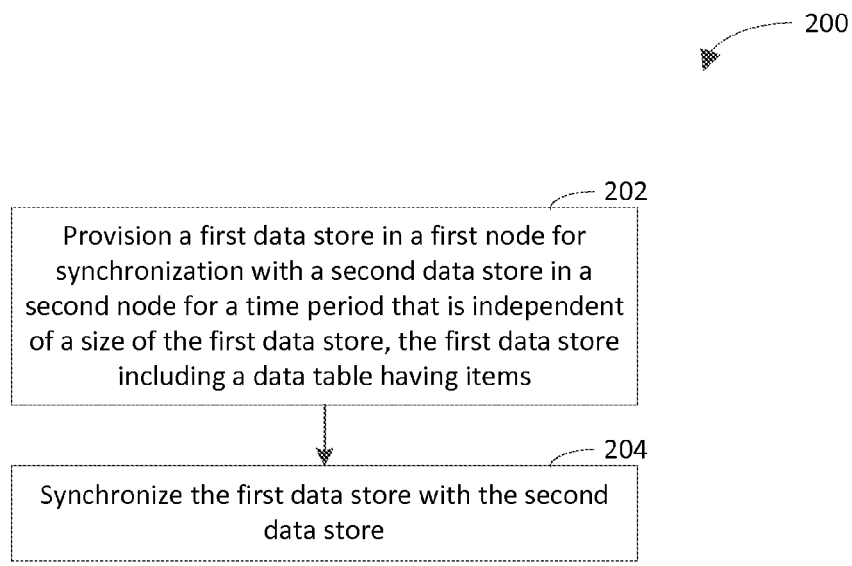
FIG. 2 depicts a flowchart of an example method for provisioning and synchronizing a data store in accordance with an embodiment.

FIG. 2 depicts a flowchart 200 of an example method for provisioning and synchronizing a data store in accordance with an embodiment. As shown in FIG. 2, the method of flowchart 200 begins at step 202. In step 202, a first data store in a first node is provisioned for synchronization with a second data store in a second node for a time period that is independent of a size of the first data store. The first data store includes a data table having items. In an example implementation, provisioning logic 702 provisions the first data store for synchronization with the second data store in response to receipt of synchronization request 724. Some example techniques for provisioning the first data store for synchronization with the second data store are described below with reference to flowchart 300 of FIG. 3.

At step 204, the first data store is synchronized with the second data store. In an example implementation, synchronization logic 704 synchronizes the first data store with the second data store. Some example techniques for synchronizing the first data store with the second data store are described below with reference to flowcharts 400, 500, and 600 of respective FIGS. 4, 5, and 6.

In some example embodiments, one or more steps 202 and/or 204 of flowchart 200 may not be performed. Moreover, steps in addition to or in lieu of steps 202 and/or 204 may be performed.

Figure 3:
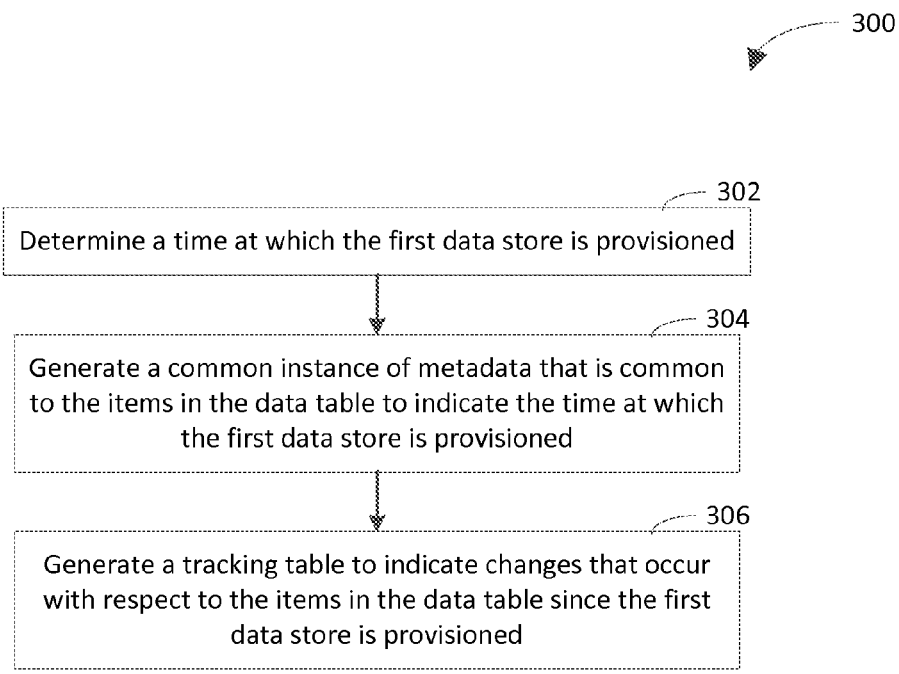
FIG. 3 depicts a flowchart of an example method for provisioning a data store for synchronization with another data store in accordance with an embodiment.

FIG. 3 depicts a flowchart 300 of an example method for provisioning the first data store for synchronization with the second data store in accordance with an embodiment. As shown in FIG. 3, the method of flowchart 300 begins at step 302. In step 302, a time at which the first data store is provisioned is determined. In an example implementation, time logic 706 determines the time at which the first data store is provisioned. In accordance with this example implementation, time logic 706 generates a time indicator 726 that indicates the time at which the first data store is provisioned.

At step 304, a common instance of metadata that is common to the items in the data table is generated to indicate the time at which the first data store is provisioned. In an example, the common instance of the metadata may identify the first node. In another example, the common instance of the metadata may have a size that is independent of the size of the first data store. For instance, the size of the common instance of the metadata may be predetermined and/or fixed. In an example implementation, metadata logic 708 generates common metadata instance 728, which is common to the items in the data table. In accordance with this implementation, metadata logic 708 provides the common metadata instance 728 to synchronization logic 704 for use during a synchronization of the first data store that occurs in response to provisioning of the first data store. Metadata logic 708 may store the common metadata instance 728 externally to the first data store, though the scope of the example embodiments is not limited in this respect. For instance, metadata logic 708 may store the common metadata instance 728 in store 108 of FIG. 1.

At step 306, a tracking table is generated to indicate changes that occur with respect to the items in the data table since the first data store is provisioned. For example, the tracking table may be generated to include no records upon completion of the provisioning of the first data store. In accordance with this example, generation of records in the tracking table may be delayed until synchronization of the first data store is initiated. In an example implementation, tracking logic 710 generates an empty tracking table 730. The empty tracking table 730 does not include records corresponding to the items in the data table. In accordance with this implementation, tracking logic 710 provides the empty tracking table 730 to synchronization logic 704 for use during the synchronization of the first data store that occurs in response to the provisioning of the first data store.

In an example embodiment, the common instance of the metadata is generated at step 304 in lieu of generating multiple item-specific instances of the metadata that correspond to the respective items to indicate the time at which the first data store is provisioned. For example, the common instance of the metadata may be generated non-iteratively in lieu of generating the multiple item-specific instances of the metadata iteratively (e.g., successively and/or consecutively). In another example, the common instance of the metadata may be generated in lieu of generating multiple records in the tracking table that indicate the time at which the first data store is provisioned. In accordance with this example, the multiple records include the respective item-specific instances of the metadata.

In some example embodiments, one or more steps 302, 304, and/or 306 of flowchart 300 may not be performed. Moreover, steps in addition to or in lieu of steps 302, 304, and/or 306 may be performed.

Figure 4:
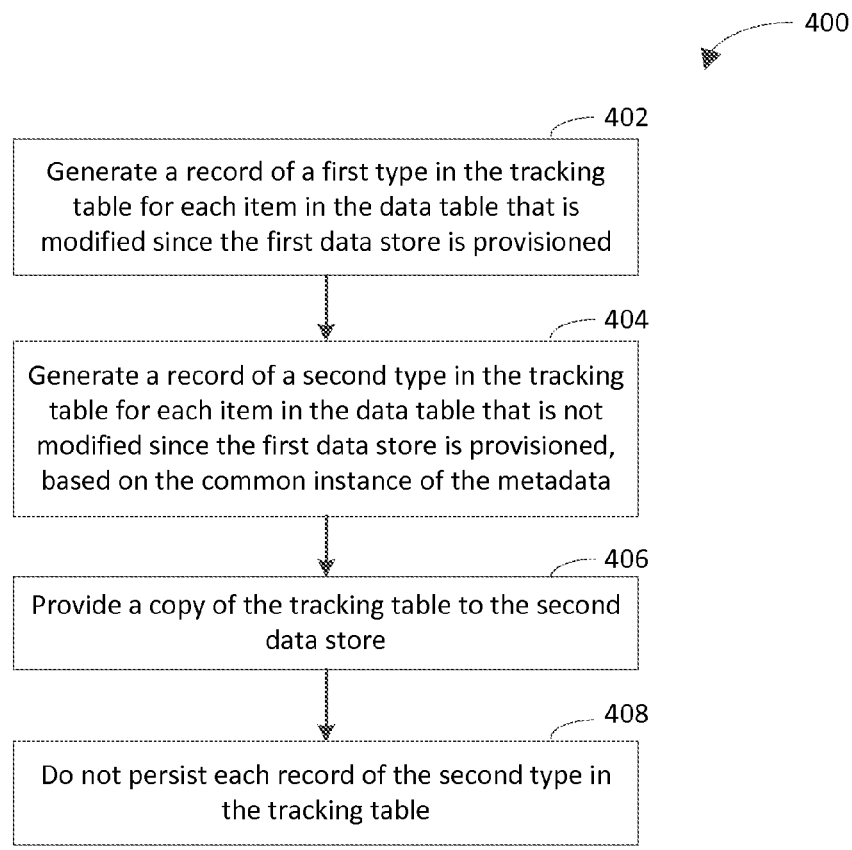
FIG. 4 depicts a flowchart of an example method for synchronizing a data store with another data store in accordance with an embodiment.

FIG. 4 depicts a flowchart 400 of an example method for synchronizing the first data store with the second data store in accordance with an embodiment. As shown in FIG. 4, the method of flowchart 400 begins at step 402. In step 402, a record of a first type is generated in the tracking table for each item in the data table that is modified since the first data store is provisioned. Each record of the first type indicates a version of the corresponding item that includes a corresponding modification. Each record of the first type further indicates a time at which the corresponding item is modified to include the corresponding modification. Each record of the first type may further indicate an entity that caused the corresponding modification, though the scope of the example embodiments is not limited in this respect. For instance, the entity may be a data store that is synchronized with the first data store, a processing system that is used (e.g., by a human user) to manually modify item(s) in the data table, etc. Example ways in which an item may be modified include but are not limited to adding the item to the data table, deleting the item from the data table, adding information in the item, removing information from the item, replacing information in the item with other information, etc. Each record of the first type may be generated in response to a table trigger that is associated with the data table. A table trigger is procedural code that is automatically executed in response to modification of an item in a data table. In an example implementation, first record logic 712 generates first type record(s) 734 for inclusion in the empty tracking table 730. Each of the first type record(s) 734 corresponds to a respective item in the data table that is modified since the first data store is provisioned. First record logic 712 may generate the first type record(s) 734 in response to receipt of modification indicator(s) 732. For example, the modification indicator(s) 732 may be received from the first node. In another example, each of the first type record(s) 734 may correspond to a respective modification indicator among the modification indicator(s) 732.

At step 404, a record of a second type is generated in the tracking table for each item in the data table that is not modified since the first data store is provisioned, based on the common instance of the metadata. For example, the record(s) of the second type may be generated on the fly based on the common instance of the metadata. In another example, the record(s) of the second type may be generated at runtime. The record(s) of the second type indicate the time at which the first data store is provisioned. In an example implementation, second record logic 714 generates second type record(s) 736 for inclusion in the empty tracking table 730 based on common metadata instance 728. Each of the second type record(s) 736 corresponds to a respective item in the data table that is not modified since the first data store is provisioned.

At step 406, a copy of the tracking table is provided to the second data store. In an example implementation, provision logic 716 includes the first type record(s) 734 and the second type record(s) 736 in the empty tracking table 730 to provide an updated tracking table 738. In accordance with this implementation, provision logic 716 provides a copy of the updated tracking table 738 to the second data store.

At step 408, each record of the second type is not persisted in the tracking table. For instance, inclusion of each record of the second type in the tracking table may be discontinued. In an example implementation, provision logic 716 does not persist the second type record(s) 736 in the updated tracking table 738. For instance, provision logic 716 may remove the second type record(s) 736 from the updated tracking table 738 in response to providing the copy of the updated tracking table 738 to the second data store.

Figure 5:
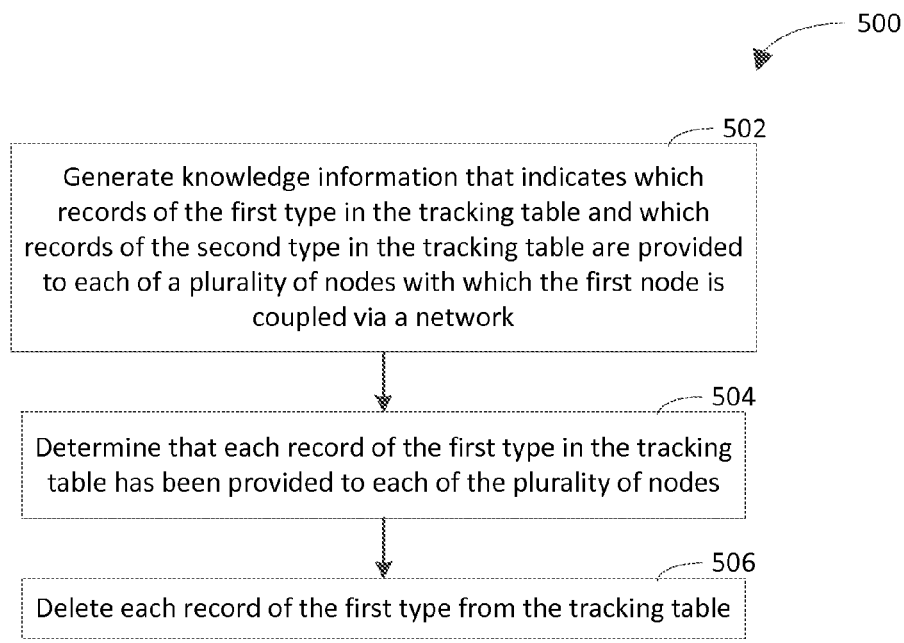
FIG. 5 depicts a flowchart of an example method for reducing a number of records in a tracking table in accordance with an embodiment.

In some example embodiments, one or more steps 402, 404, 406, and/or 408 of flowchart 400 may not be performed. Moreover, steps in addition to or in lieu of steps 402, 404, 406, and/or 408 may be performed. For instance, in an example embodiment, flowchart 400 of FIG. 4 includes one or more of the steps shown in flowchart 500 of FIG. 5. As shown in FIG. 5, the method of flowchart 500 begins at step 502. In step 502, knowledge information is generated that indicates which records of the first type in the tracking table and which records of the second type in the tracking table are provided to each of a plurality of nodes with which the first node is coupled via a network. In an example implementation, knowledge logic 718 generates knowledge information 742 to indicate which of the first type record(s) 734 and which of the second type record(s) 736 are provided to each of the plurality of nodes with which the first node is coupled via the network. For example, provision logic 716 may generate (e.g., automatically generate) a provision notifier each time a first type record or a second type record is provided to a node in the plurality of nodes. Each provision notifier may indicate the respective first or second type record and the node in the plurality of nodes to which the first or second type record is provided. Such provision notifier(s) are referred to cumulatively as provision notifier(s) 740 in FIG. 7. In accordance with this example, knowledge logic 718 may analyze the provision notifier(s) 740 to determine which of the first type record(s) 734 and which of the second type record(s) 736 are provided to each of the plurality of nodes.

At step 504, a determination is made that each record of the first type in the tracking table has been provided to each of the plurality of nodes. In an example implementation, determination logic 720 determines that each of the first type record(s) 734 has been provided to each of the plurality of nodes. For instance, determination logic 720 may cross-reference the knowledge information 742 with the first type record(s) 734 to make the determination. Determination logic 720 may provide a provision indicator 744 to indicate that each of the first type record(s) 734 has been provided to each of the plurality of nodes.

At step 506, each record of the first type is deleted from the tracking table. In an example implementation, deletion logic 722 deletes each of the first type record(s) 734 from the tracking table. For instance, deletion logic 722 may delete each of the first type record(s) 734 from the updated tracking table 738 in response to receipt of the provision indicator 744.

It will be recognized that record(s) of the first type (or a subset thereof) may be deleted based on one or more factors in addition to or in lieu of a determination that each record of the first type (or the subset thereof) has been provided to each of the plurality of nodes. For instance, a subset of the record(s) of the first type may be deleted from the tracking table based on a most recent modification of each record in the subset occurring at least a specified period of time (e.g., 2 weeks, 1 month, 60 days, etc.) prior to a time at which deletion of the subset of the record(s) of the first type is to occur.

In an example embodiment, record(s) of the first type in the tracking table that correspond to respective item(s) that have been deleted from the first data store are deleted from the tracking table based on passage of a specified period of time (e.g., 12 hours, 1 day, 10 days, 20 days, 1 week, etc.) from a reference time. For instance, the reference time may be a time at which an item was most recently deleted from the first data store. In accordance with this embodiment, record(s) of the first type in the tracking table that do not correspond to respective item(s) that have been deleted from the first data store are not deleted from the tracking table based on passage of the specified period of time from the reference time.

In some example embodiments, one or more steps 502, 504, and/or 506 of flowchart 500 may not be performed. Moreover, steps in addition to or in lieu of steps 502, 504, and/or 506 may be performed.

Figure 6:
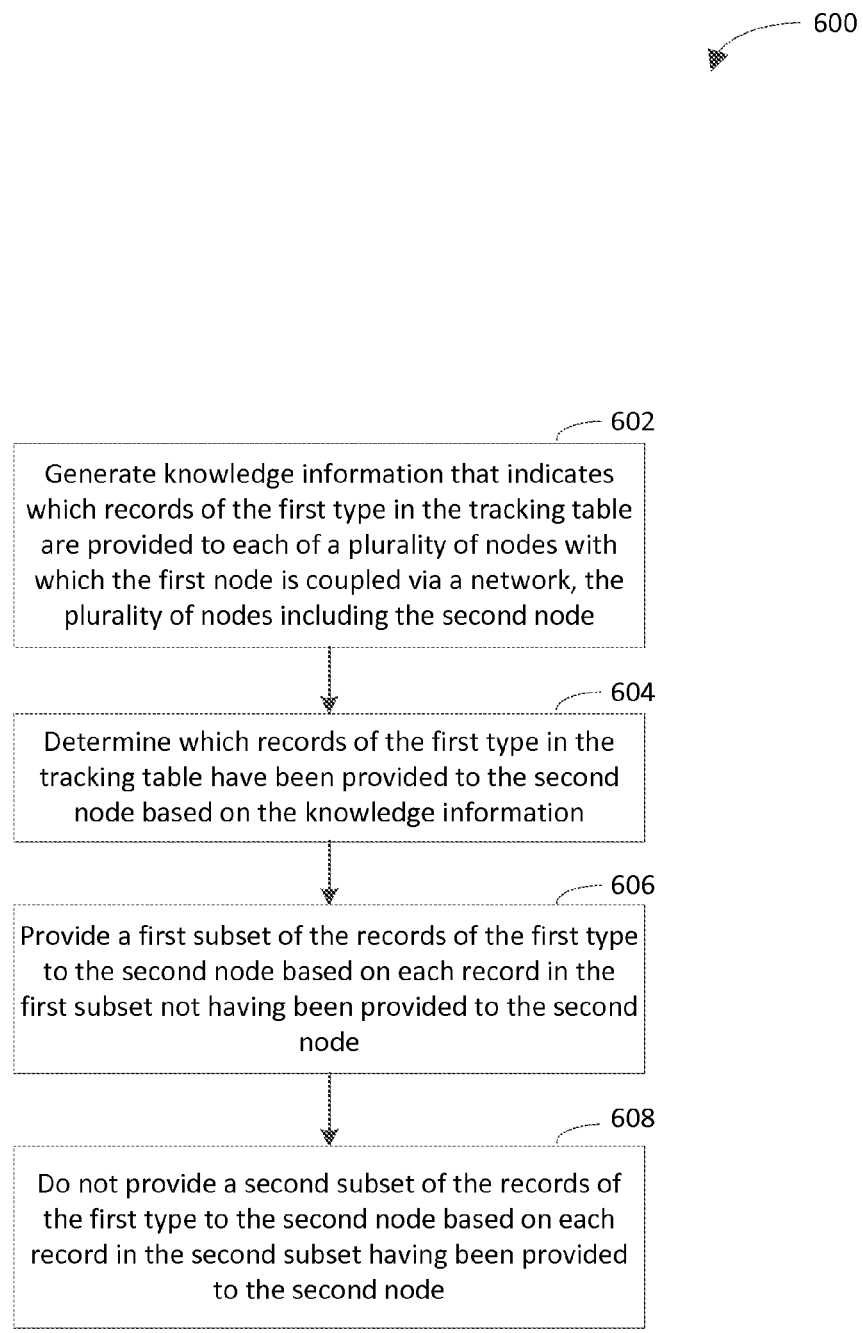
FIG. 6 depicts a flowchart of an example method for selectively providing records in a tracking table to a node in accordance with an embodiment.
Figure 7:
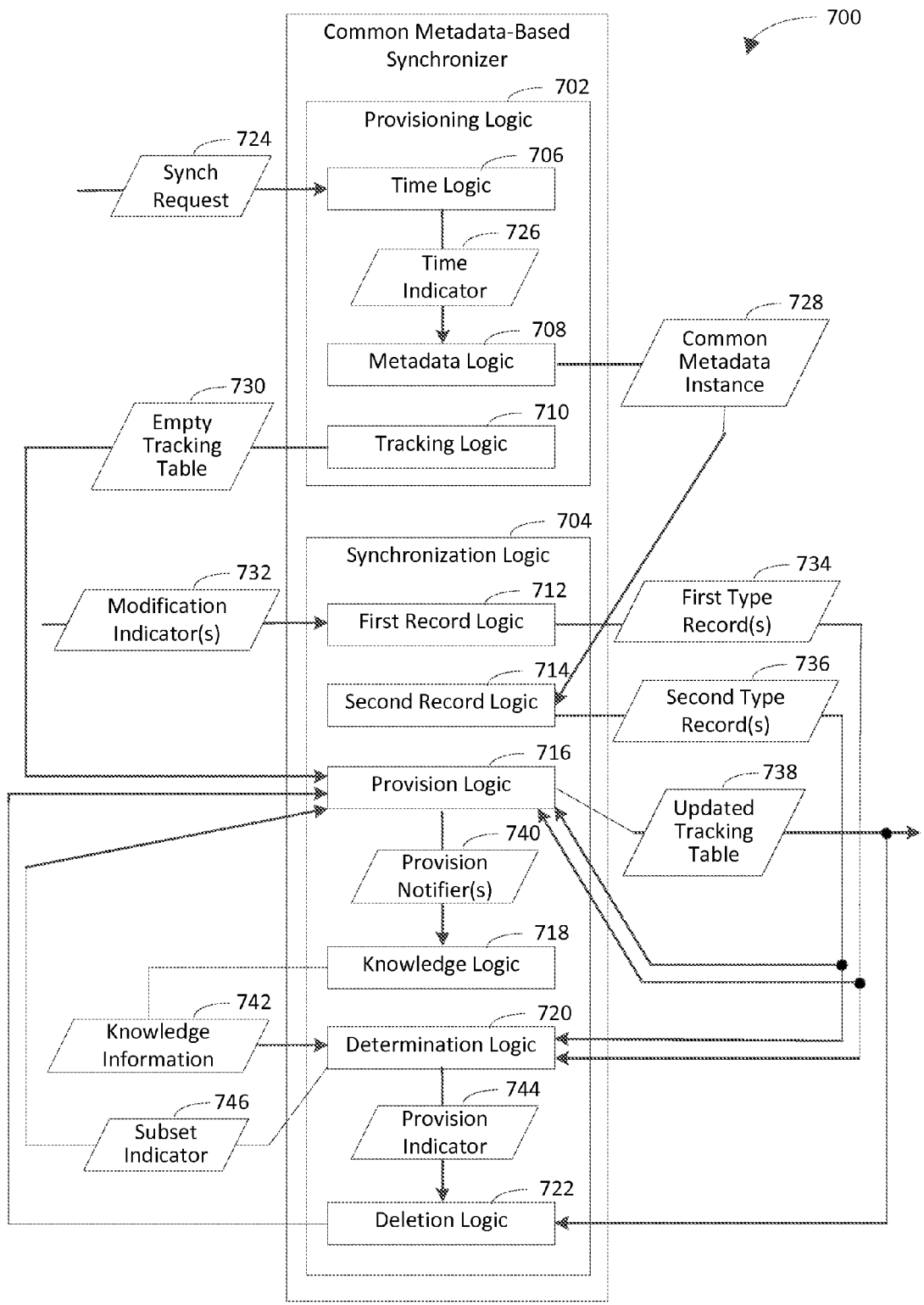
FIG. 7 is a block diagram of an example implementation of a common metadata-based synchronizer shown in FIG. 1 in accordance with an embodiment.

In another example embodiment, flowchart 400 of FIG. 4 includes one or more of the steps shown in flowchart 600 of FIG. 6. As shown in FIG. 6, the method of flowchart 600 begins at step 602. In step 602, knowledge information is generated that indicates which records of the first type in the tracking table are provided to each of a plurality of nodes with which the first node is coupled via a network. The plurality of nodes includes the second node. In an example implementation, knowledge logic 718 generates knowledge information 742 to indicate which of the first type record(s) 734 are provided to each of the plurality of nodes with which the first node is coupled via the network.

At step 604, a determination is made which records of the first type in the tracking table have been provided to the second node based on the knowledge information. In an example implementation, determination logic 720 determines which of the first type record(s) 734 have been provided to the second node based on the knowledge information 742. In accordance with this implementation, determination logic 720 provides a subset indicator 746 to indicate which of the first type record(s) 734 have been provided to the second node.

At step 606, a first subset of the records of the first type is provided to the second node based on each record in the first subset not having been provided to the second node. In an example implementation, provision logic 716 provides a first subset of the first type record(s) 734 to the second node based on each record in the first subset not having been provided to the second node. For instance, provision logic 716 may provide the first subset of the first type record(s) 734 to the second node in response to receipt of subset indicator 746.

At step 608, a second subset of the records of the first type is not provided to the second node based on each record in the second subset having been provided to the second node. In an example implementation, provision logic 716 does not provide a second subset of the first type record(s) 734 to the second node based on each record in the second subset having been provided to the second node. For instance, provision logic 716 may not provide the second subset of the first type record(s) 734 to the second node in response to receipt of subset indicator 746. In an example, provision logic 716 may provide updated tracking table 738 to include the first subset of the first type record(s) 734 and to not include the second subset of the first type record(s) 734. In accordance with this example, provision logic 716 may provide the updated tracking table 738 to the second node.

In some example embodiments, one or more steps 602, 604, 606, and/or 608 of flowchart 600 may not be performed. Moreover, steps in addition to or in lieu of steps 602, 604, 606, and/or 608 may be performed.

It will be recognized that common metadata-based synchronizer 700 may not include one or more of provisioning logic 702, synchronization logic 704, time logic 706, metadata logic 708, tracking logic 710, first record logic 712, second record logic 714, provision logic 716, knowledge logic 718, determination logic 720, and/or deletion logic 722. Furthermore, common metadata-based synchronizer 700 may include modules in addition to or in lieu of provisioning logic 702, synchronization logic 704, time logic 706, metadata logic 708, tracking logic 710, first record logic 712, second record logic 714, provision logic 716, knowledge logic 718, determination logic 720, and/or deletion logic 722.

Common metadata-based synchronizer 106, provisioning logic 702, synchronization logic 704, time logic 706, metadata logic 708, tracking logic 710, first record logic 712, second record logic 714, provision logic 716, knowledge logic 718, determination logic 720, deletion logic 722, and flowcharts 200, 300, 400, 500, and 600 may be implemented in hardware, software, firmware, or any combination thereof.

For example, common metadata-based synchronizer 106, provisioning logic 702, synchronization logic 704, time logic 706, metadata logic 708, tracking logic 710, first record logic 712, second record logic 714, provision logic 716, knowledge logic 718, determination logic 720, deletion logic 722, flowchart 200, flowchart 300, flowchart 400, flowchart 500, and/or flowchart 600 may be implemented as computer program code configured to be executed in one or more processors.

In another example, common metadata-based synchronizer 106, provisioning logic 702, synchronization logic 704, time logic 706, metadata logic 708, tracking logic 710, first record logic 712, second record logic 714, provision logic 716, knowledge logic 718, determination logic 720, deletion logic 722, flowchart 200, flowchart 300, flowchart 400, flowchart 500, and/or flowchart 600 may be implemented as hardware logic/electrical circuitry. For instance, in an embodiment, one or more of common metadata-based synchronizer 106, provisioning logic 702, synchronization logic 704, time logic 706, metadata logic 708, tracking logic 710, first record logic 712, second record logic 714, provision logic 716, knowledge logic 718, determination logic 720, deletion logic 722, flowchart 200, flowchart 300, flowchart 400, flowchart 500, and/or flowchart 600 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
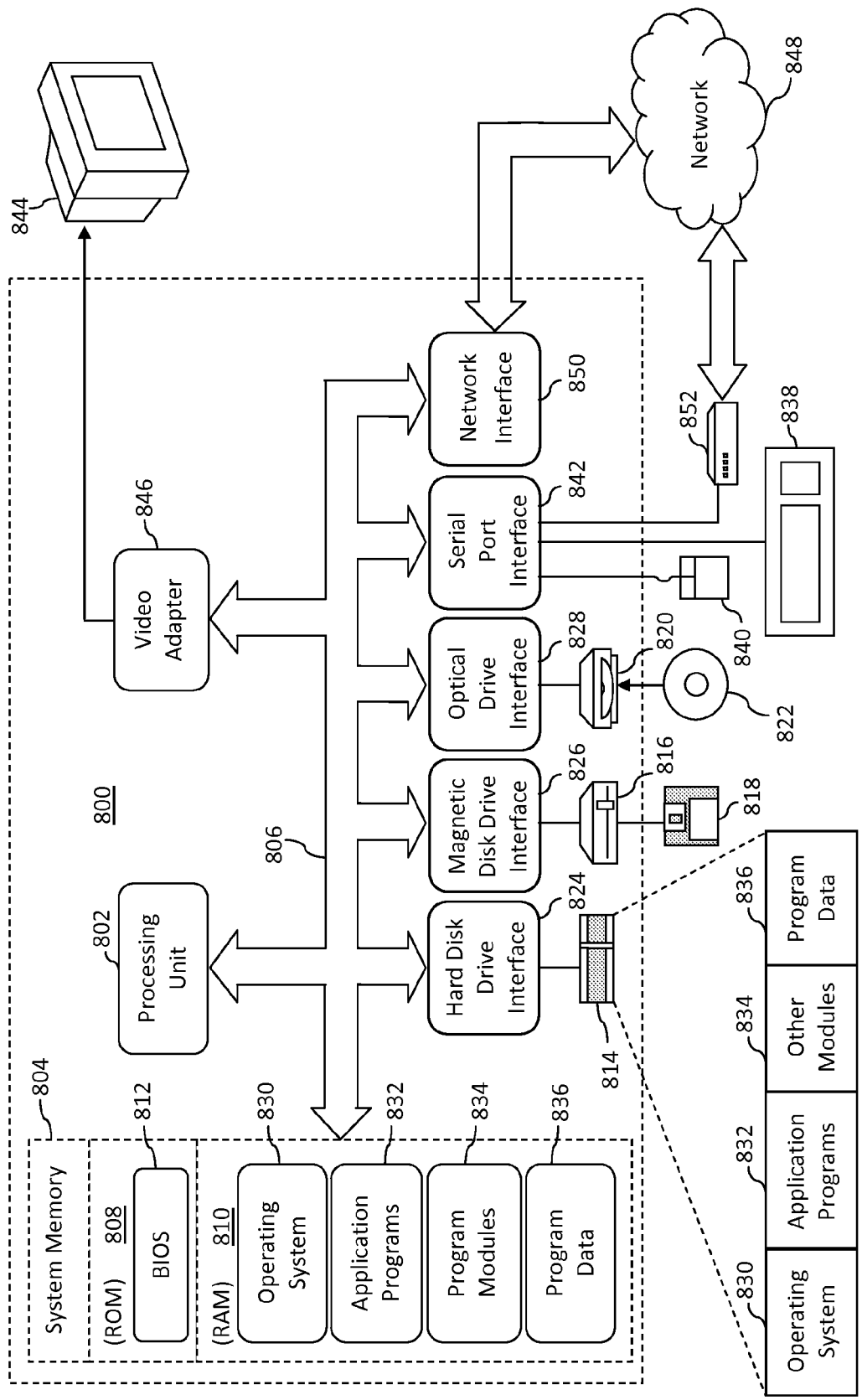
FIG. 8 depicts an example computer in which embodiments may be implemented.

FIG. 8 depicts an example computer 800 in which embodiments may be implemented. Any one or more of the nodes 102A-102N or common metadata-based synchronizer 106 shown in FIG. 1 (or any one or more subcomponents thereof shown in FIG. 7) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing common metadata-based synchronizer 106, provisioning logic 702, synchronization logic 704, time logic 706, metadata logic 708, tracking logic 710, first record logic 712, second record logic 714, provision logic 716, knowledge logic 718, determination logic 720, deletion logic 722, flowchart 200 (including any step of flowchart 200), flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:
1. A method comprising:
provisioning a first data store in a first node for synchronization with a second data store in a second node, the first data store including a data table that has a plurality of items, the provisioning comprising:
determining a time instance at which the first data store is provisioned;
generating a common instance of metadata that is common to the plurality of items to indicate the time instance at which the first data store is provisioned; and
generating a tracking table to indicate changes that occur with respect to the plurality of items in the data table since the first data store is provisioned; and
synchronizing the first data store with the second data store, the synchronizing comprising:
generating a record of a first type in the tracking table for each item of the plurality of items in the data table that is modified since the first data store is provisioned, each record of the first type indicating a version of the corresponding item that includes a corresponding modification and further indicating a time instance at which the corresponding item is modified to include the corresponding modification; and
generating a record of a second type in the tracking table for each item of the plurality of items in the data table that is not modified since the first data store is provisioned, based on the common instance of the metadata, to indicate the time instance at which the first data store is provisioned.

2. The method of claim 1, wherein generating the tracking table comprises:
   generating the tracking table to include no records upon completion of the provisioning of the first data store.

3. The method of claim 1, wherein synchronizing the first data store with the second data store further comprises:
   providing a copy of the tracking table to the second data store; and
   not persisting each record of the second type in the tracking table in response to providing the copy of the tracking table to the second data store.

4. The method of claim 1, wherein generating a record of the second type in the tracking table for each item of the plurality of items in the data table that is not modified comprises:
   generating a record of the second type in the tracking table on the fly for each item of the plurality of items in the data table that is not modified.

5. The method of claim 1, wherein the method further comprises:
   generating knowledge information that indicates which records of the first type in the tracking table and which records of the second type in the tracking table are provided to each of a plurality of nodes with which the first node is coupled via a network;
   determining that each record of the first type in the tracking table has been provided to each of the plurality of nodes; and
   deleting each record of the first type from the tracking table in response to determining that each record of the first type has been provided to each of the plurality of nodes.

6. The method of claim 1, wherein the method further comprises:
   generating knowledge information that indicates which records of the first type in the tracking table are provided to each of a plurality of nodes with which the first node is coupled via a network, the plurality of nodes including the second node;
   determining which records of the first type in the tracking table have been provided to the second node based on the knowledge information;
   providing a first subset of the records of the first type to the second node based on each record in the first subset not having been provided to the second node; and
   not providing a second subset of the records of the first type to the second node based on each record in the second subset having been provided to the second node.

7. The method of claim 1, wherein generating the common instance of the metadata includes:
   generating the common instance of the metadata to identify the first node.

8. The method of claim 1, further comprising:
   storing the common instance of the metadata externally to the first data store.

9. A system comprising:
   one or more processors; and
   provisioning logic, implemented using at least one of the one or more processors, configured to provision a first data store in a first node for synchronization with a second data store in a second node, the first data store including a data table that has a plurality of items, the provisioning logic comprising:
      time logic configured to determine a time instance at which the first data store is provisioned;
      metadata logic configured to generate a common instance of metadata that is common to the plurality of items to indicate the time instance at which the first data store is provisioned; and
      tracking logic configured to generate a tracking table to indicate changes that occur with respect to the plurality of items; and
   synchronization logic configured to synchronize the first data store with the second data store, the synchronization logic comprising:
      first record logic configured to generate a record of a first type in the tracking table for each item of the plurality of items in the data table that is modified since the first data store is provisioned, each record of the first type indicating a version of the corresponding item that includes a corresponding modification and further indicating a time instance at which the corresponding item is modified to include the corresponding modification; and
      second record logic configured to generate a record of a second type in the tracking table for each item of the plurality of items in the data table that is not modified since the first data store is provisioned, based on the common instance of the metadata, to indicate the time instance at which the first data store is provisioned.

10. The system of claim 9, wherein the synchronization logic further comprises:
    provision logic configured to provide a copy of the tracking table to the second data store; and
    wherein the second record logic is configured to not persist each record of the second type in the tracking table in response to the copy of the tracking table being provided to the second data store.

11. The system of claim 9, further comprising:
    knowledge logic configured to generate knowledge information that indicates which records of the first type in the tracking table and which records of the second type in the tracking table are provided to each of a plurality of nodes with which the first node is coupled via a network;
    determination logic configured to determining whether each record of the first type in the tracking table has been provided to each of the plurality of nodes; and
    deletion logic configured to delete each record of the first type from the tracking table in response to a determination that each record of the first type has been provided to each of the plurality of nodes.

12. The system of claim 9, further comprising:
    knowledge logic configured to generate knowledge information that indicates which records of the first type in the tracking table are provided to each of a plurality of nodes with which the first node is coupled via a network, the plurality of nodes including the second node;
    determination logic configured to determine which records of the first type in the tracking table have been provided to the second node based on the knowledge information; and
    provision logic configured to provide a first subset of the records of the first type to the second node based on each record in the first subset not having been provided to the second node, the provision logic further configured to not provide a second subset of the records of the first type to the second node based on each record in the second subset having been provided to the second node.

13. The system of claim 9, further comprising:
    a third data store configured to store the common instance of the metadata, the third data store being different from the first data store.

14. The system of claim 9, wherein the tracking table includes no records upon completion of provisioning of the first data store.

15. The system of claim 9, wherein the second record logic is configured to generate the record of the second type in the tracking table on the fly for each item of the plurality of items in the data table that is not modified since the first data store is provisioned.

16. A computer program product comprising a computer-readable storage medium having computer program logic recorded thereon for enabling a processor-based system to synchronize a first data store in a first node with a second data store in a second node, the computer program product comprising:

a first program logic module for enabling the processor-based system to provision the first data store for synchronization with the second data store for a time period that is independent of a size of the first data store, the first data store including a data table that has a plurality of items, the first program logic module comprising:

time logic for enabling the processor-based system to determine a time instance at which the first data store is provisioned, and metadata logic for enabling the processor-based system to generate a common instance of metadata that is common to the plurality of items to indicate the time instance at which the first data store is provisioned in lieu of generating a plurality of item-specific instances of the metadata corresponding to the plurality of respective items to indicate the time instance at which the first data store is provisioned; and a second program logic module for enabling the processor-based system to synchronize the first data store with the second data store, the second program logic module comprising:

first record logic for enabling the processor-based system to generate a record of a first type in a tracking table for each item of the plurality of items in the data table that is modified since the first data store is provisioned, each record of the first type indicating a version of the corresponding item that includes a corresponding modification and further indicating a time instance at which the corresponding item is modified to include the corresponding modification, and second record logic for enabling the processor-based system to generate a record of a second type in the tracking table for each item of the plurality of items in the data table that is not modified since the first data store is provisioned, based on the common instance of the metadata, to indicate the time instance at which the first data store is provisioned.

17. The computer program product of claim 16, wherein the first program logic module comprises:

tracking logic for enabling the processor-based system to generate the tracking table to indicate changes that occur with respect to the plurality of items in the data table, the tracking table including no records upon completion of provisioning of the first data store.

18. The computer program product of claim 16, wherein the second program logic module further comprises:

provision logic for enabling the processor-based system to provide a copy of the tracking table to the second data store; and wherein the second recording logic enables the processor-based system to discontinue inclusion of each record of the second type in the tracking table in response to provision of the copy of the tracking table to the second data store.

19. The computer program product of claim 16, further comprising:

a third program logic module for enabling the processor-based system to generate knowledge information that indicates which records of the first type in the tracking table and which records of the second type in the tracking table are provided to each of a plurality of nodes with which the first node is coupled via a network;

a fourth program logic module for enabling the processor-based system to determine whether each record of the first type in the tracking table has been provided to each of the plurality of nodes; and a fifth program logic module for enabling the processor-based system to delete each record of the first type from the tracking table in response to a determination that each record of the first type has been provided to each of the plurality of nodes.

20. The computer program product of claim 16, further comprising:

a third program logic module for enabling the processor-based system to generate knowledge information that indicates which records of the first type in the tracking table are provided to each of a plurality of nodes with which the first node is coupled via a network, the plurality of nodes including the second node;

a fourth program logic module for enabling the processor-based system to determine which records of the first type in the tracking table have been provided to the second node based on the knowledge information; and a fifth program logic module for enabling the processor-based system to provide a first subset of the records of the first type to the second node based on each record in the first subset not having been provided to the second node, the provision logic further configured to not provide a second subset of the records of the first type to the second node based on each record in the second subset having been provided to the second node.

* * * * *